US012645197B2

(12) United States Patent
Agrawal et al.

(10) Patent No.: US 12,645,197 B2
(45) Date of Patent: Jun. 2, 2026

(54) DYNAMIC COMPUTER-BASED MANAGEMENT OF ADDITIVE MANUFACTURING

(71) Applicant: International Business Machines Corporation, Armonk, NY (US)

(72) Inventors: Tushar Agrawal, West Fargo, ND (US); Jeremy R. Fox, Georgetown, TX (US); Sarbajit K. Rakshit, Kolkata (IN); Uri Kartoun, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 864 days.

(21) Appl. No.: 18/057,756

(22) Filed: Nov. 21, 2022

(65) Prior Publication Data

US 2024/0168454 A1 May 23, 2024

(51) Int. Cl.
*G05B 19/4099* (2006.01)
*B29C 64/386* (2017.01)
*B33Y 50/00* (2015.01)

(52) U.S. Cl.
CPC ........ *G05B 19/4099* (2013.01); *B29C 64/386* (2017.08); *B33Y 50/00* (2014.12); *G05B 2219/32228* (2013.01); *G05B 2219/49023* (2013.01)

(58) Field of Classification Search
CPC ........... G05B 2219/49023; G05B 2219/32228; G05B 19/4099; B29C 64/386; B33Y 50/00
See application file for complete search history.

(56) References Cited

U.S. PATENT DOCUMENTS

| | | | |
|---|---|---|---|
| 9,668,024 B2 | 5/2017 | Van Os | |
| 10,882,247 B2 | 1/2021 | Van Esbroeck | |
| 11,358,337 B2 * | 6/2022 | Czinger | ........... G05B 19/41815 |
| 2018/0194075 A1 * | 7/2018 | Hardee | ................. B33Y 10/00 |
| 2019/0039138 A1 | 2/2019 | Zafar | |
| 2020/0079028 A1 | 3/2020 | Miller | |

(Continued)

OTHER PUBLICATIONS

Pearson, Jordan, "New Fabric Could Turn All Our Clothes into Robots", vice.com, Sep. 24, 2014, 3 pages, <https://www.vice.com/en/article/z4mq3j/new-fabric-could-turn-all-our-clothes-into-robots>.

(Continued)

*Primary Examiner* — Robert E Fennema
*Assistant Examiner* — Yvonne Trang Follansbee
(74) *Attorney, Agent, or Firm* — Joseph P. Curcuru

(57) ABSTRACT

In an approach to improve additive manufacturing embodiments receive, by a sensor set, data associated with an object or a predetermined area, and retrieve, by a knowledge corpus, historic data associated with the object or the predetermined area. Further, embodiments identify a defect on or within an object based on an identified difference in the received data and the historic data and identify, by the sensor set, a target area on the object to repair the defect. Additionally, embodiments create, by a context-aware robotic system, a physical support around the target area, and repair, by an additive manufacturing mechanism and the physical support, the defect by applying three-dimensional printing-based rectification to the defect.

20 Claims, 4 Drawing Sheets

(56) References Cited

U.S. PATENT DOCUMENTS

| 2022/0088685 A1* | 3/2022 | Kenworthy | B33Y 50/02 |
| 2025/0214177 A1* | 7/2025 | Funatsu | B23K 26/147 |

OTHER PUBLICATIONS

Unknown, "3D Printing Support Structures: A Complete Guide", AMFG Autonomous Manufacturing, Oct. 17, 2018, 9 pages, <https://amfg.ai/2018/10/17/3d-printing-support-structures-guide/>.

Venere, Emil, "Robotic fabric could bring 'active clothing,' wearable robots", Purdue University, Sep. 23, 2014 , 3 pages, <https://www.purdue.edu/newsroom/releases/2014/Q3/robotic-fabric-could-bring-active-clothing,-wearable-robots.html>.

Yuen, et al., "Conformable Actuation and Sensing with Robotic Fabric", 2014 IEEE/RSJ International Conference on Intelligent Robots and Systems (IROS 2014), Sep. 14-18, 2014, 7 pages, <https://www.semanticscholar.org/paper/Conformable-actuation-and-sensing-with-robotic-Yuen-Cherian/c1db117e0db906b0876a967fcdb47eec61659245>.

3D Printing Market Size, Share, Trends, 2025-2030, Retrieved from: https://www.marketsandmarkets.com/Market-Reports/3d-printing-market-1276.html, Jul. 2025, 34 pages.

Digital Platform for Industrial 3D Printing, Retrieved from: https://web.archive.org/web/20230605081046/https://www.ibm.com/blog/digital-platform-for-industrial-3d-printing/, Jun. 5, 2023, 9 pages.

Fathom, Retrieved from: https://web.archive.org/web/20201101013252/https://www.ibm.com/case-studies/fathom, Nov. 1, 2020, 9 pages.

Molitch-Hou, IBM and Ricoh Partner for 3D Printed Anatomical Models, Retrieved from: https://3dprint.com/281817/ibm-and-ricoh-partner-for-3d-printed-anatomical-models/, May 25, 2021, 9 pages.

What Can't You 3D Print?, Retrieved from: https://web.archive.org/web/20240103164653/https://www.theatlantic.com/sponsored/ibm-transformation/what-cant-you-3d-print/235/, Jan. 3, 2024, 6 pages.

What is Industry 4.0?, Retrieved from: https://web.archive.org/web/20230331093513/https://www.ibm.com/topics/industry-4-0, Mar. 31, 2023, 12 pages.

* cited by examiner

100

DYNAMIC COMPUTER-BASED MANAGEMENT OF ADDITIVE MANUFACTURING

BACKGROUND OF THE INVENTION

The present invention relates generally to additive manufacturing, and more particularly to the field of improving the application and management of additive manufacturing.

Three-dimensional (3D) printing or additive manufacturing is a technology used to create three-dimensional 3D objects. Additive manufacturing is based on unique printers that process computer models and print corresponding objects in layers. At the same time, 3D printers are also being used for repairing defects such as cracks and broken parts. Additive manufacturing can be done in a variety of processes in which material is deposited, joined, or solidified under computer control, with material being added together (such as plastics, liquids or powder grains being fused), typically layer by layer. The global 3D printing market size is estimated to be USD 9.9 billion in 2018 and is expected to reach USD 34.8 billion by 2024. Factors such as ease in development of customized products, reduction in manufacturing cost and process downtime, government investments in additive manufacturing projects, and development of new industrial-grade additive manufacturing materials are driving the growth of the additive manufacturing industry. Currently, the trend in the additive manufacturing applications is shifting from prototyping to functional part manufacturing in various verticals, such as automotive, medical, aerospace, and consumer goods. 3D-printed products include those made from materials as diverse as plastic, metal, and human tissue, and as complex as replacement joints, consumer clothing and engine parts. The number and complexity of products continues to grow rapidly. The existing supply chain, with all its inefficiencies, is deeply entrenched. More important, additive manufacturing production, while more efficient and straightforward in theory, is not yet supported by its own supply chain. This gap may actually be an opportunity for transport providers, which can play a vital role in positioning inputs and products where they are needed in an additive manufacturing-centric supply chain.

SUMMARY

Embodiments of the present invention disclose a computer-implemented method, for dynamic management of additive manufacturing, the computer-implemented method comprising: receiving, by a sensor set, data associated with an object or a predetermined area; retrieving, by a knowledge corpus, historic data associated with the object or the predetermined area; identifying a defect on or within an object based on an identified difference in the received data and the historic data; identifying, by the sensor set, a target area on the object to repair the defect; creating, by a context-aware robotic system, a physical support around the target area; and repairing, by an additive manufacturing mechanism and the physical support, the defect by applying three-dimensional printing-based rectification to the defect. Additionally, the computer-implemented method comprises comparing a cavity of the physical support with a shape and dimension of a three-dimensional printed object; and identifying a secondary material is required to complete the physical support based on the comparative result of the cavity and dimension of the three-dimensional printed object, wherein the secondary material is water soluble, and wherein the secondary material is dissolved or removed after the completion of the repair. Moreover, computer-implemented method comprises aligning, by an IoT sensor, a repair mechanism with the target area and the physical support. Further, computer-implemented method comprises scanning, by a sensor set, a predetermined area or the target area to identify if the physical support is needed to execute the repair by corresponding collected data from the scan with previously utilized data stored in a knowledge corpus. Additionally, responsive to identifying that an additive manufactured area is solidified, computer-implemented method comprises completing the repair by retracting or unmounting the physical support and unmounting a repair mechanism or robotic assembly from the object or predetermined area. In this manner embodiments of the present invention enable the application of additive manufacturing to repair one or more objects in midair, which increase repair time, and reduces product lose.

In a further embodiment of the present disclosure, embodiments of the present invention disclose a computer system for implementing additive manufacturing, the computer system comprising: program instructions to receive, by a sensor set, data associated with an object or a predetermined area; program instructions to retrieve, by a knowledge corpus, historic data associated with the object or the predetermined area; program instructions to identify a defect on or within an object based on an identified difference in the received data and the historic data; program instructions to identify, by the sensor set, a target area on the object to repair the defect; program instructions to create, by a context-aware robotic system, a physical support around the target area; and program instructions to repair, by an additive manufacturing mechanism and the physical support, the defect by applying three-dimensional printing-based rectification to the defect. Further, computer system comprises program instructions to compare a cavity of the physical support with a shape and dimension of a three-dimensional printed object; and program instructions to identify a secondary material is required to complete the physical support based on the comparative result of the cavity and dimension of the three-dimensional printed object, wherein the secondary material is water soluble, and wherein the secondary material is dissolved or removed after the completion of the repair. Additionally, computer system comprises program instructions to align, by an IoT sensor, a repair mechanism with the target area and the physical support. Moreover, computer system comprises program instructions to scan, by a sensor set, a predetermined area or the target area to identify if the physical support is needed to execute the repair by corresponding collected data from the scan with previously utilized data stored in a knowledge corpus. Additionally, responsive to identifying that an additive manufactured area is solidified, computer system comprises program instructions to complete the repair by retracting or unmounting the physical support and unmounting a repair mechanism or robotic assembly from the object or predetermined area. In this manner embodiments of the present invention enable the application of additive manufacturing to repair one or more objects in midair, which increase repair time, and reduces product lose.

In a further embodiment of the present disclosure, embodiments of the present invention disclose a computer program product for implementing additive manufacturing, the computer program product comprising: program instructions to receive, by a sensor set, data associated with an object or a predetermined area; program instructions to retrieve, by a knowledge corpus, historic data associated with the object or the predetermined area; program instructions to identify a defect on or within an object based on an identified difference in the received data and the historic data; program instructions to identify, by the sensor set, a target area on the object to repair the defect; program instructions to create, by a context-aware robotic system, a physical support around the target area; and program instructions to repair, by an additive manufacturing mechanism and the physical support, the defect by applying three-dimensional printing-based rectification to the defect. Further, computer program product comprises program instructions to compare a cavity of the physical support with a shape and dimension of a three-dimensional printed object; and program instructions to identify a secondary material is required to complete the physical support based on the comparative result of the cavity and dimension of the three-dimensional printed object, wherein the secondary material is water soluble, and wherein the secondary material is dissolved or removed after the completion of the repair. Additionally, computer program product comprises program instructions to align, by an IoT sensor, a repair mechanism with the target area and the physical support. Moreover, computer program product comprises program instructions to scan, by a sensor set, a predetermined area or the target area to identify if the physical support is needed to execute the repair by corresponding collected data from the scan with previously utilized data stored in a knowledge corpus. Additionally, responsive to identifying that an additive manufactured area is solidified, computer program product comprises program instructions to complete the repair by retracting or unmounting the physical support and unmounting a repair mechanism or robotic assembly from the object or predetermined area. In this manner embodiments of the present invention enable the application of additive manufacturing to repair one or more objects in midair, which increase repair time, and reduces product lose.

DETAILED DESCRIPTION

Figure 1A:
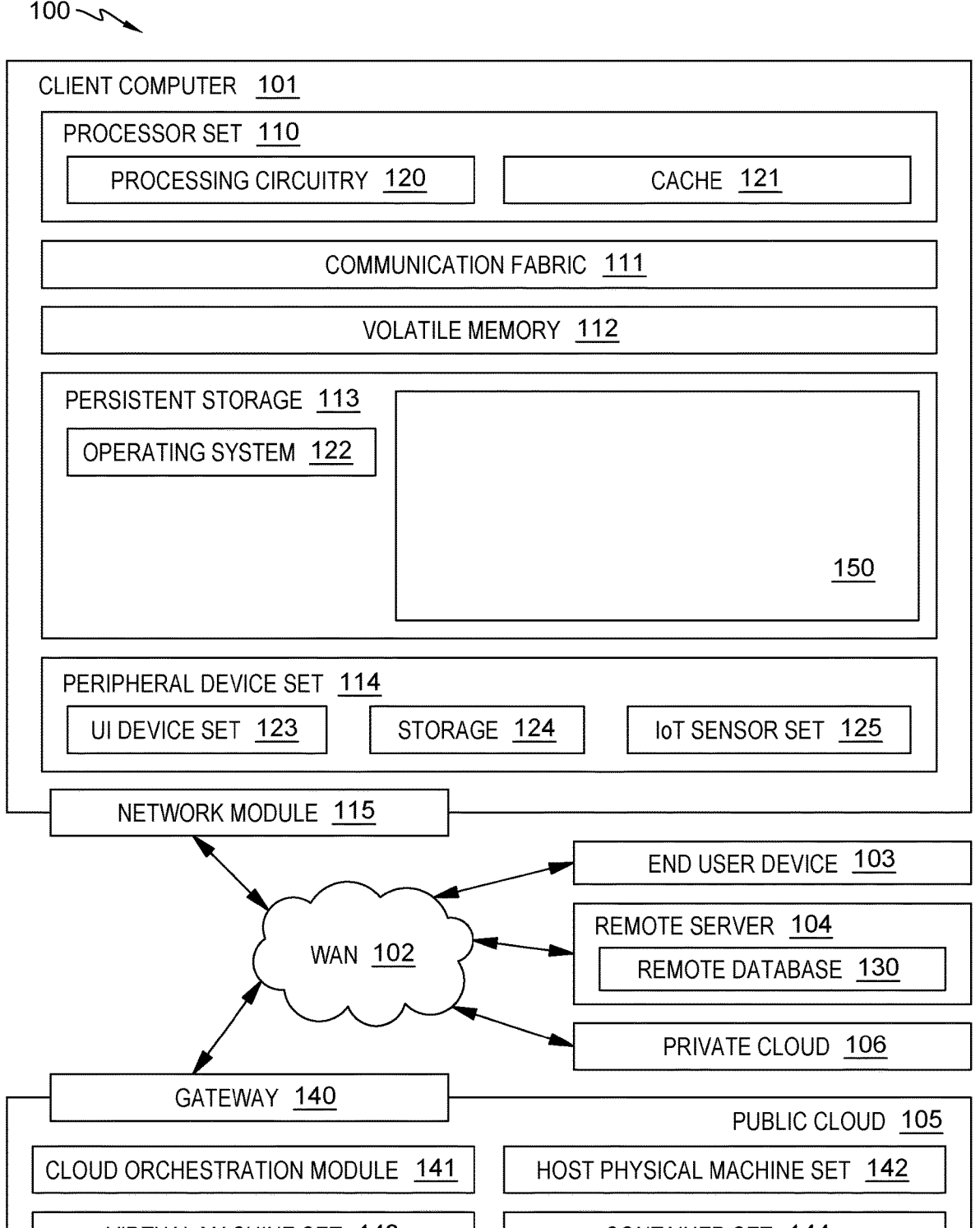
FIG. 1A is a functional block diagram illustrating a distributed data processing environment, executing a dynamic management program, in accordance with an embodiment of the present invention.

Embodiments recognize that a three-dimensional (3D) printer can be used to repair a gap or space between two parts or an opening in a single piece that is broken (e.g., hole in a wall). However, embodiments of the present invention recognizes that a physical support layer is needed to support the 3D printing (i.e., additive manufacturing) to remedy the defect (e.g., closing or filing the gap or space, connecting two or more pieces, etc.). Embodiments of the present invention recognize that without any physical support, the layer by layer printing performed by the 3D printer would struggle or fail to produce a remedy for the defect.

Embodiments of the present invention improve the art and solve at least the particular issues stated above by (i) identifying a defect in an object, (ii) identifying areas of printing to repair the defect, (iii) printing a context-aware dice (boxed platform) dynamically around an area of the printing where a physical support is identified to be required, and (iv) accordingly after creating a physical support, executing a 3D printing-based rectification correct the defect. Therefore, embodiments of the present invention are advantageous because they provide the ability to execute 3D printing in areas that are known to be difficult or impossible to receive 3D printing. It is important to note that the terms 3D printing and additive manufacturing are synonymous.

Implementation of embodiments of the invention may take a variety of forms, and exemplary implementation details are discussed subsequently with reference to the Figures (i.e., FIG. 1A-FIG. 3).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for the execution of at least some of the computer code involved in performing the inventive methods, such as dynamic management program (component) 150. In addition to component 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and component 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in component 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in component 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, central processing unit (CPU) power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Component 150 may utilize an autonomous 3D printer to create a context aware boxed platform dynamically around a predetermined or identified area where physical support is required to enable additive manufacturing, and accordingly executing a 3D printing-based rectification to correct an identified defect. Component 150 may identify a defect based on an available plan (i.e., plan) that serves as a baseline for a target item. The plan may be available as original blueprints, original models for plan builds, specifications of the target item, information regarding the target item in a manual, a digital twin, and/or any other type or form of information that discloses dimensions, details, and/ or specifications regarding an item and/or predetermined area that is known and understood in the art. Component 150 may utilize the plan or historic image (e.g., original photograph or video of the item) to identify a defect in the item by comparing a current visual image of the item to the original state of the item that is depicted in the plan or historic image and identifying and labeling the difference between the current and historic image as the defect.

A defect may be any physical defect associated with a physical object (e.g., crack, tear, hole, break, etc.) that is known and understood in the art. In various embodiments, component 150 creates a mid-air boxed platform (i.e., physical support) to repair or seal an identified defect. For example, a 3D printer comprises a dynamic dice (i.e., boxed platform) creation module that is utilized to create a physical support to enable the 3D printer to perform 3D printing mid-air on the physical support to repair or seal a suspended pipe. Dynamic dice are a physical building material that can be positioned within a three-dimensional space. In various embodiments, component 150 may size the mid-air boxed platform based on the identified or predetermined printing requirements. In various embodiments, dynamic dice, via a dice creating module, receives the required final shape of the target object (i.e., object that is identified to be rectified or printed with 3D printer) from component 150, and component 150, via the dice creation module, creates an approximate shape and profile of the dice so that, 3D printer can use the dice for printing. For example, component 150 identifies that a support beam is missing a portion of material. In this example, component 150 identifies that the missing portion is thirty centimeters by fourteen centimeters and instructs the dynamic dice to create a platform that is thirty centimeters by fourteen centimeters.

In various embodiments, one or more sensors (e.g., camera and/or a texture analyzer) are installed on, within, and/or around the boxed platform, wherein the installed one or more sensors are utilized to determine if the 3D printed portion (i.e., rectified portion) is properly solidified. In various embodiments, the one or more sensors are IoT sensor set 125. IoT sensor set 125 may be any combination of proximity sensors, image sensor, motion sensor, thermistor, capacity sensing, photoelectric sensor, infrared sensor, level sensor, humidity sensor, pressure sensor, temperature sensor, and/or any sensor and/or IoT sensor known and understood in the art. Moreover, the dynamic dice (i.e., boxed platform) may utilize the one or more installed sensors to dynamically change/adjust a current shape and/or dimensions to enable additive manufacturing and/or self-remove from the rectified area. In various embodiments, if the proposed boxed platform is unable to create identified approximate shape or reach the identified approximate dimensions, then component 150, via a 3D printer, executes the printing of a secondary material to enable the boxed platform to reach the identified shape and/or dimensions by utilizing the initial shape of the identified device (e.g., target area) and subsequently performing 3D printing of the primary material onto and/or around the boxed platform.

Component 150 may remove the secondary material when the boxed platform is removed. The secondary material may be water soluble and may be dissolved or removed after the robotic cloth is self-removed. For example, a water-soluble polymer such as polyethylene glycol, polyacrylamides, polyacrylic acid copolymer, and polyvinyl alcohol are organic polymers that dissolve, disperse, or swell in water and consequently change the physical properties of aqueous systems undergoing gelation or thickening, or a water-soluble polyvinyl alcohol (PVA) is typically used to create temporary support-based structures. In various embodiments, based on an identified or predetermined shape and predetermined profile required for additive manufacturing, component 150 incrementally creates a physical support and gradually remedies/repairs the identified object, via a 3D printer, using the physical support to ensure the 3D printing is stable. For example, component 150, based on received dimensions and profile (e.g., blueprints), creates a physical support, via dynamic dice, to create a bridge across two pieces of pipeline to enable additive manufacturing to connect the two pieces of pipeline, wherein the shape of the dynamic dice is responsive to the received dimensions and profile.

Figure 2:
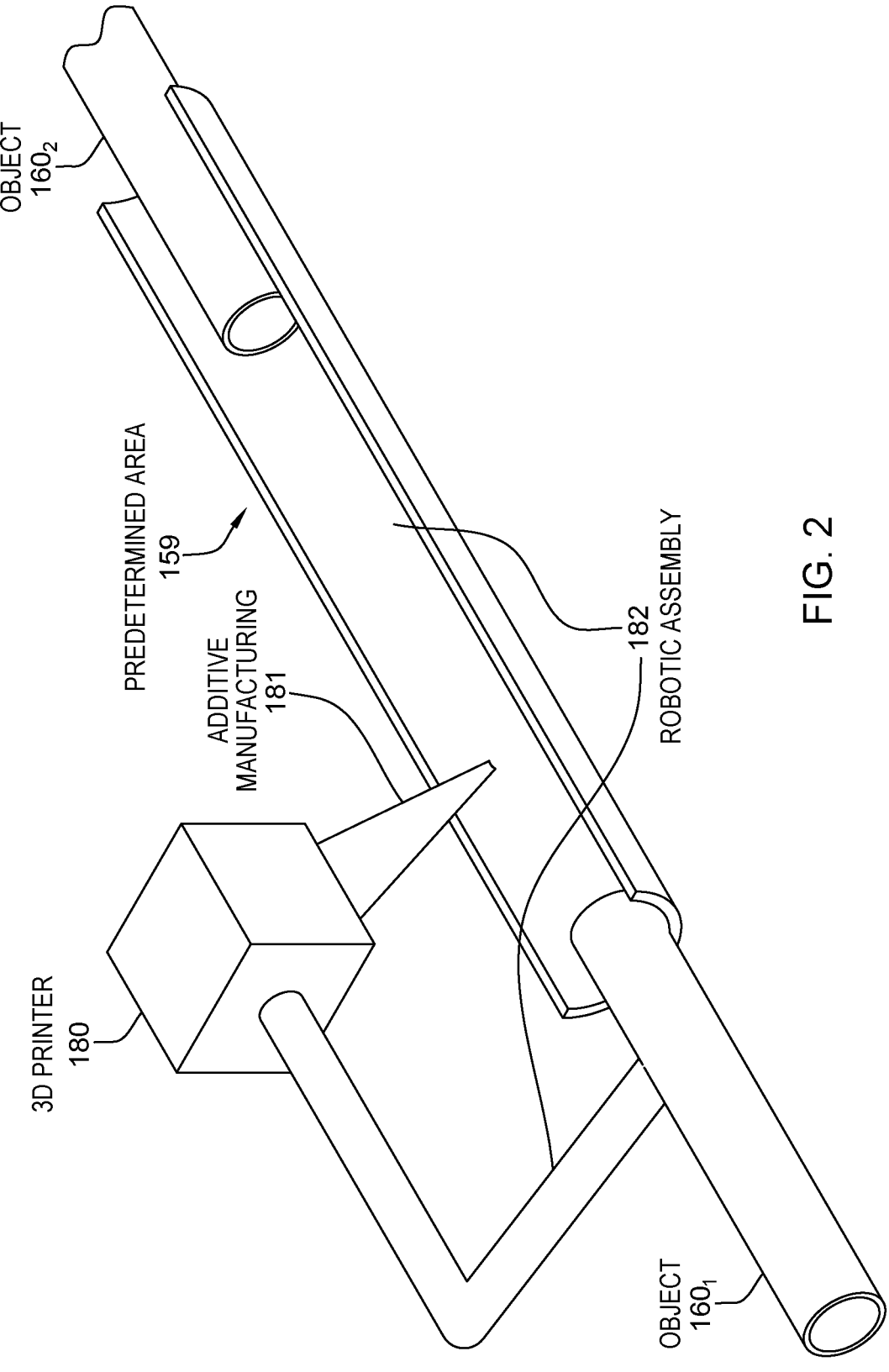
FIG. 2 illustrates one example, in accordance with an embodiment of the present invention.

In various embodiments, component 150 may utilize a robotic system (e.g., robotic cloth) to dynamically create a boxed platform (i.e., physical support) based on the identified shape and dimension of the target object (i.e., physical object that is identified to be remedied/repaired). In some embodiments, component 150, via communicatively coupled sensors (e.g., IoT sensor set 125), determines whether an object requires repair, identifies the area of repair, and identifies whether a physical support is required to conduct the repair. In various embodiments, component 150 may utilize and manage (e.g., operate) a robotic system (e.g., robotic cloth), wherein the component 150 instructs the robotic system to dynamically adjust a physical profile of the robotic system, based on the shape and dimension of the target object, to provide physical support for 3D printing. In some embodiments, component 150 utilizes a robotic cloth to dynamically create a physical platform to provide physical support in the area where 3D printing is identified to occur. An example is depicted in FIG. 2.

In various embodiments, a 3D printer communicatively coupled to component 150 comprises a chamber to store the robotic cloth, wherein the chamber and/or robotic assembly can be attached to a robotic assembly. The robotic assembly may be communicatively coupled to a 3D printer and/or component 150. In various embodiments, the 3D printing machine (e.g., 3D printer) comprises at least 2 nozzles, wherein a first nozzle prints a physical barrier or enhances an existing physical barrier (e.g., dynamic dice) if the robotic cloth is unable to dynamically adjust to an identified or predetermined shape or dimension. Component 150 may create a physical barrier by 3D printing a barrier if an existing box assembly or robotic cloth are too large to fit in a predetermined area. Conversely, component 150 may enhance an existing physical barrier by 3D printing on an existing physical barrier if the existing barrier is unable to reach or fulfill the predetermined area or identified object. The second nozzle, or any nozzle after the first nozzle, may add other types of filament that may be different from the filament that is loaded in the first nozzle (i.e., primary nozzle).

Figure 1B:
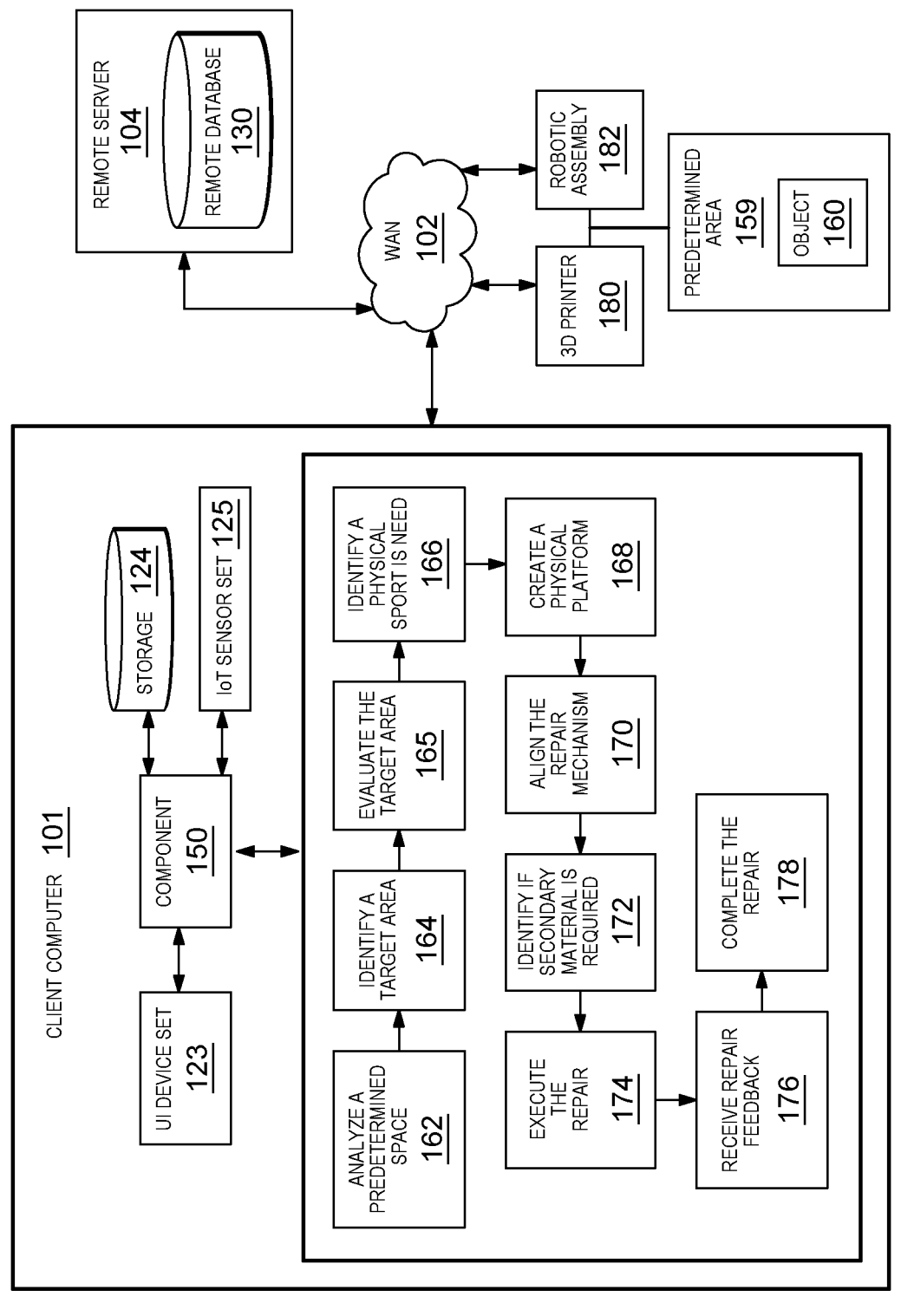
FIG. 1B illustrates a functional block diagram and operational steps of the dynamic management program, on a server computer within the distributed data processing environment of FIGS. 1A, in accordance with an embodiment of the present invention.

FIG. 1B is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1B provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes predetermined area 159, client computer 101, 3D printer 180, robotic assembly 182, and remote server 104 interconnected WAN 102.

In the depicted embodiment, component 150, via IoT sensor set 125, analyzes predetermined space 162, wherein predetermined space 162 may be an identified area or surrounding area within a predetermined location or within a predetermined range from object 160. Component 150 may scan, via IoT sensor set 125, predetermined area 159 and/or object 160 to identify a target area 164, wherein a target area is an area of interest (i.e., area that needs repair) on object 160. For example, a fracture on a pipe in a pipeline. In various embodiments, component 150 evaluates, via storage 124 (e.g., a knowledge corpus) and IoT sensor set 125, target area 164 to identify a remedy/repair for the identified target area 164 by (i) receiving data from IoT sensor set 125, (ii) analyzing the received data, (iii) corresponding the analyzed received data with data in knowledge corpus, and (iv) matching previously used data sets from the knowledge corpus to the analyzed received data to identify a solution (e.g., repair). Component 150 may incorporate prior learning knowledge, stored on a knowledge corpus, associated with utilizing 3D printing to repair similarly identified issues (i.e., target area) to identify a current target area and identify how to repair the current target area.

For example, a smart IoT pipeline detects a loss in pressure within a certain section of the pipeline. In this example, the IoT data from the IoT pipeline provides a loss (lower pressure) reading against the known and trusted data in a knowledge corpus. Further, using the IoT data, component 150 derives that the section of the pipe needs that needs to be repaired to restore the lost pressure. In this example, component 150 retrieves a method to repair (i.e., repair plan) the IoT pipeline from the knowledge corpus and initiates the 3D printer system to execute the retrieved repair plan. In some embodiments, component 150 may receive manual input/feedback from a user regarding the dice, physical support, target area, and/or repair technique/method. A repair plan may comprise, the steps/instructions, material, shape and/or dimensions of a physical support, if a physical support is needed, and/or any other information needed to repair an object.

In the depicted embodiment, component 150 scans, via IoT sensor set 125, predetermined area 159 and/or an identified target area 164 to identify if a physical support is needed 166 to enable a repair. Component 150 may scan, via IoT sensor set 125, predetermined area 159 and/or an identified target area 164 to identify if a physical support is needed 166 by corresponding collected data from the scan with previously utilized data stored in the knowledge corpus. For example, based on the collected data, component 150 identifies that a fracture in a free hanging pipeline has no support physical support in the surrounding area and thus will need to implement a physical support to execute the repair. In another example, in addition to identifying the free hanging pipeline has no physical support in the surrounding area, component 150 identifies and retrieves data associated with previously executed repairs on free hanging pipelines, other free hanging options, and/or fractured pipelines to identify methods of repair (i.e., how to repair the fractured pipe/repair plans). In some embodiments, component 150 may compile a ranked list of identified repair plans and issue the compiled list to a user in a responsive prompt, wherein component 150 is responsive to user input and the repair method selected.

In the depicted embodiment, responsive to identifying a physical support is needed 166, component 150 creates a physical platform (i.e., physical support) to support the repair. In some embodiments, component 150 prints a mid-air support platform to support the repair. In various embodiments, creates an intelligent mid-air support platform to act as a physical support around the target area and enable additive manufacturing. The intelligent mid-air support platform comprises various sensors that pertain to live monitoring that are known an understood in the art. In the depicted embodiment, 3D printer 180 is communicatively coupled to component 150 and comprises a chamber to store robotic assembly 182, wherein the robotic assembly 182 is utilized by component 150 to create a physical support to enable 3D printer 180 to perform additive manufacturing on and/or around the target area (i.e., repair the identified defect). Robotic assembly 182 may be a robotic cloth, dynamic dice, and/or any other form of robotic assembly known and understood in the art. For example, component 150 deploys the robotic cloth to create a supportive bridge between two pieces of a pipeline and enable additive manufacturing to create connecting piece of pipe and repair the pipeline. Component 150 may manipulate the physical profile of the robotic cloth (e.g., fold, twist, bend, etc.) to create a physical support that fits within predetermined area 159 and/or on or around object 160 and/or an identified target area 164. In various embodiments, responsive to additive manufacturing being performed, component 150 instructs the robotic cloth to adjust its position to enable 3D printer 180 to continue or further extend printing. For example, if the robotic cloth has a maximum length of three feet and the length of the repair (e.g., gap) is six feet, then component 150 instructs the robotic cloth to incrementally adjust its position, based on the received repair feedback 176, to provide a physical support and enable printing across the six-foot repair length.

In various embodiments, robotic assembly 182 comprises a robotic cloth, wherein component 150 deploys the robotic cloth to take an identified shape and become physical boxed platform and act as a physical support or enable additive manufacturing of a physical support on the physical boxed platform. The identified shape is a shape that component 150 identifies through an analysis of predetermined area 159, object 160, and/or an identified target area 164 by IoT sensor set 125 and a knowledge corpus. In the depicted embodiment, component 150 aligns the repair mechanism 170 with the identified target area 164. In various embodiments, component 150 utilizes a robotic cloth to align robotic assembly 182 and/or 3D printer 180 with the identified target area 164, wherein the robotic cloth acts a physical support to enable additive manufacturing to repair the identified target area 164. Component 150 may compare a cavity of the dice (mid-air boxed platform) created by the robotic cloth with the shape and dimension of the 3D printed object. In the depicted embodiment, based on the comparative result of the cavity of the dice and dimension of the 3D printed object, component 150 identifies if a secondary material is required 172 to complete the dice. For example, if a first material has exceeded the bounds or limits of the amount or properties of the first material and component 150 determines that a harder, stronger, higher quality secondary material needs to be used then component 150, based on stress data, chemical composition, bond strength, and compatibility associated with known materials identifies a second material that satisfies the harder, stronger, higher quality requirements.

In depicted embodiment, component 150 executes the repair 174 using primary material and utilized the created physical support, wherein the primary material is a predetermined material that is known and understood in the art. In the depicted embodiment, component 150, via IoT sensor set 125, receives repair feedback 176 (e.g., printing feedback), which enables additive manufacturing monitoring. For example, printing feedback enables component 150 to adjust the robotic assembly 182 or 3D printer 180 to ensure it remains aligned with the dice and/or target area and monitor the progress of the additive manufacturing (e.g., identify the level of completion, identify if the 3D printed area has solidified, and/or if the repair was successful). In the depicted embodiment, responsive to identifying that the 3D printed area is solidified, component 150 completes the repair 178 by retracting and/or unmounting the physical barrier (e.g., robotic cloth) and unmounting 3D printer 180 and/or robotic assembly 182 from the object 160 and/or predetermined area 159.

FIG. 2 is an example to how the robotic cloth is dynamically deployed to provide a physical support in the area where 3D printing, or rectification is required. In the depicted embodiment, 3D printer 180 is coupled to robotic assembly; however, only a portion of robotic assembly 182 is depicted for simplification. In this example, component 150 identified that object 160₁ is a free hanging piece of pipeline that needs to be connected to object 160₂, and in order to apply additive manufacturing 181 to join object 160₁ and object 160₂ (hereinafter referred to as the objects) a physical support is required to enable additive manufacturing to occur (e.g., provide a stable printing surface, enable the material to dry, harden and/or cure, etc.). Therefore, component 150 identifies the shape necessary to facilitate additive manufacturing between the objects and determines the distance between the objects and deploys robotic assembly 182 to match the identified distance and shape of the objects. In this example, object 1601 and object 1602 are free hanging pipes meaning they are tubular thus component 150 instructs robotic assembly to form a semicircle around both of the objects to execute additive manufacturing 181 and connect the objects using robotic assembly as a supportive structure. In various embodiments, four-dimensional (4D) printing involves 3D printing objects that can self-assemble and transform based on some external stimuli. For example, a table that assembles itself when a portion of the table is touched, or an airplane wing that transforms with wind speed, or a temperature-activated cardio stent.

Figure 3:
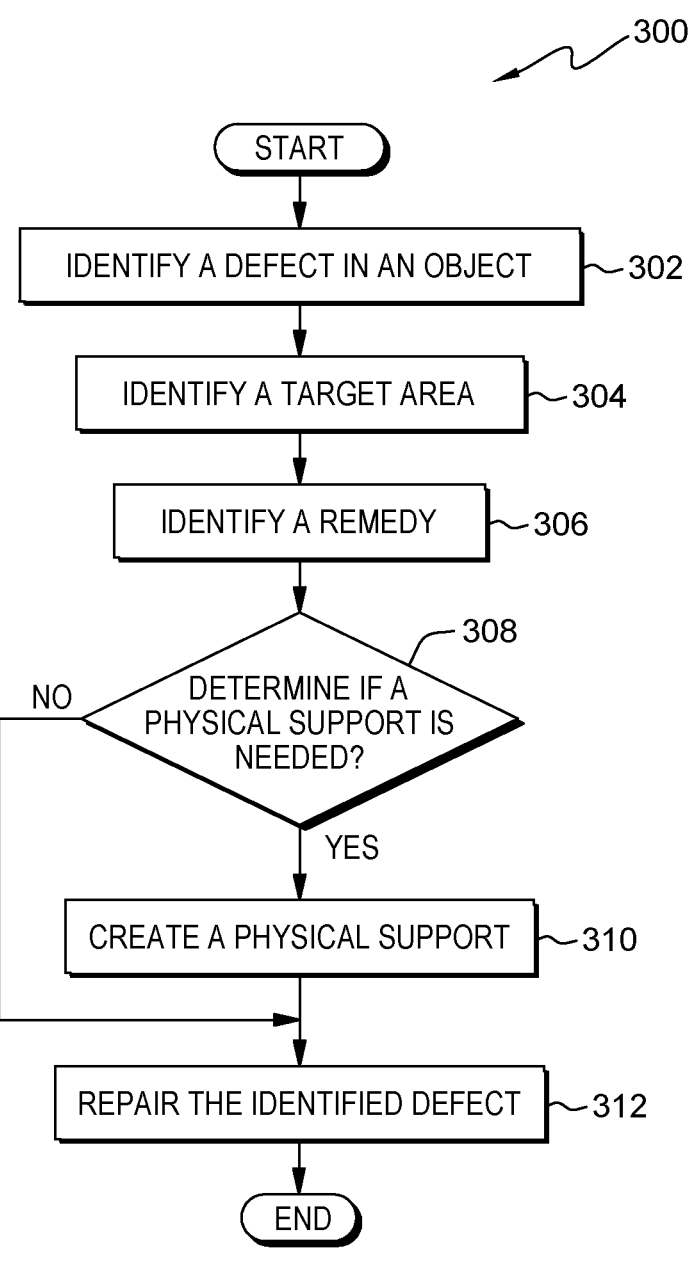
FIG. 3 illustrates operational steps of the dynamic management program, on a server computer within the distributed data processing environment of FIGS. 1A, in accordance with an embodiment of the present invention.

FIG. 3 illustrates operational steps of component 150, generally designated 200, in communication with client computer 101, remote server 104, private cloud 106, EUD 103, and/or public cloud 105, within distributed data processing environment 100, for managing additive manufacturing, in accordance with an embodiment of the present invention. FIG. 3 provides an illustration of one implementation and does not imply any limitations with regard to the environments in which different embodiments may be implemented. Many modifications to the depicted environment may be made by those skilled in the art without departing from the scope of the invention as recited by the claims.

In step 302, component 150 identifies a defect in an object. In various embodiments, component 150, via IoT sensors, identifies one or more defects in or around an object. Component 150 may utilize an autonomous 3D printer to create a context aware boxed platform dynamically around a predetermined or identified area where physical support is required to enable additive manufacturing, and accordingly executing a 3D printing-based rectification to correct an identified defect. Component 150 may identify a defect based on an available plan (i.e., plan) that serves as a baseline for a target item. The plan may be available as original blueprints, original models for plan builds, specifications of the target item, information regarding the target item in a manual, a digital twin, and/or any other type or form of information that discloses dimensions, details, and/or specifications regarding an item and/or predetermined area that is known and understood in the art.

In step 304, component 150 identifies a target area. In various embodiments, component 150, via IoT sensors, identifies one or more target areas on the object. Component 150 may scan, via IoT sensor set 125, a predetermined area and/or object to identify a target area, wherein a target area is an area of interest (i.e., area that needs repair) on the object. For example, a fracture on a pipe in a pipeline.

In step 306, component 150 identifies a remedy to the defect. In various embodiments, component 150 identifies one or more remedies (e.g., method of repair, repair technique, how to repair the identified defect, etc.) based on collected data from IoT sensors and a knowledge corpus. In various embodiments, component 150 evaluates, via storage 124 (e.g., a knowledge corpus) and IoT sensor set 125, a target area to identify a remedy/repair for the identified target area by (i) receiving data from IoT sensor set 125, (ii) analyzing the received data, (iii) corresponding the analyzed received data with data in knowledge corpus, and (iv) matching previously used data sets from the knowledge corpus to the analyzed received data to identify a solution (e.g., repair). Received data may be data associated with an object or predetermined area. For example, image data, dimensional data, spatial data, temperature, humidity, pressure, proximity, speed, rotation, light, gas or chemical levels, and/or any other measurable data known and/or understood in the art. Component 150 may incorporate prior learning knowledge, stored on a knowledge corpus, associated with utilizing 3D printing to repair similarly identified issues (i.e., target area) to identify a current target area and identify how to repair the current target area.

In step 308, component 150 determines if a physical support is needed to enable remedy/repair. In various embodiments, component 150 determines, via IoT sensors and/or a knowledge corpus if a physical support is needed to enable the repairing of the identified defect. In the depicted embodiment, if component 150 determines that a physical support is needed to enable the repairing of the identified defect, (Yes step) then component 150 advances to step 308. In the depicted embodiment, if component 150 determines that a physical support is not needed to enable the repairing of the identified defect, (No step) then component 150 advances to step 312. Component 150 may scan, via IoT sensor set 125, a predetermined area and/or an identified target area to identify if a physical support is needed to enable a repair or to execute a repair plan. Component 150 may scan, via IoT sensor set 125, the predetermined area 159 and/or identified target area to identify if a physical support is needed by corresponding collected data from the scan with previously utilized data stored in the knowledge corpus.

In step 310 component 150 creates a physical support. In various embodiments, component 150 creates, via additive manufacturing or a robotic system, a physical support to enable additive manufacturing. In various embodiments, component 150 creates a mid-air boxed platform (i.e., physical support) to repair or seal an identified defect. For example, a 3D printer comprises a dynamic dice (i.e., boxed platform) creation module that is utilized to create a physical support to enable the 3D printer to perform 3D printing mid-air on the physical support to repair or seal a suspended pipe. Component 150 may utilize an autonomous 3D printer to create a context aware boxed platform dynamically around a predetermined or identified area where physical support is required to enable additive manufacturing, and accordingly executing a 3D printing-based rectification to correct an identified defect.

In step 312, component 150 repairs the identified defect. In various embodiments, component 150 executes a command to initiate the repair and manages, via IoT sensors, the progress and success of the repair. In various embodiments, component 150, via a 3D printer, implements a retrieved repair plan by executing and managing the progress of additive manufacturing to repair the defect. Managing the progress of the additive manufacturing may be, but is not limited to, determining if the repair is following the repair plan, correcting the repair if the repair is not following the repair plan (e.g., realigning the 3D printer or using a secondary material), monitoring the temperature of the 3D printer and the applied repair material (e.g., plastic, metal, and/or any material used by a 3D printer in an additive manufacturing process), monitoring the drying and/or cooling of the applied repair material, monitoring the amount of applied repair material, and monitoring the progress of the repair plan.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for implementing additive manufacturing, the computer-implemented method comprising:

receiving, by a sensor set, data associated with an object or a predetermined area;

retrieving, by a knowledge corpus, historic data associated with the object or the predetermined area;

identifying a defect on or within an object based on an identified difference in the received data and the historic data;

identifying, by the sensor set, a target area on the object to repair the defect;

creating, by a context-aware robotic system, a physical support around the target area, wherein the physical support comprises a mid-air boxed platform dynamically sized using a dynamic dice creation module; and repairing, by an additive manufacturing mechanism and the physical support, the defect by applying three-dimensional printing-based rectification to the defect.

2. The computer-implemented method of claim 1, wherein identifying the defect comprises:

scanning, by a sensor set, a predetermined area and the object to identify the target area.

3. The computer-implemented method of claim 1, wherein the robotic system is a robotic cloth.

4. The computer-implemented method of claim 1, further comprising:

comparing a cavity of the physical support with a shape and dimension of a three-dimensional printed object; and identifying a secondary material is required to complete the physical support based on the comparative result of the cavity and dimension of the three-dimensional printed object, wherein the secondary material is water soluble, and wherein the secondary material is dissolved or removed after the completion of the repair.

5. The computer-implemented method of claim 1, further comprising:

aligning, by an IoT sensor, a repair mechanism with the target area and the physical support.

6. The computer-implemented method of claim 1, further comprising:

scanning, by a sensor set, a predetermined area or the target area to identify if the physical support is needed to execute the repair by corresponding collected data from the scan with previously utilized data stored in a knowledge corpus.

7. The computer-implemented method of claim 1, further comprising:

responsive to identifying that an additive manufactured area is solidified, completing the repair by retracting or unmounting the physical support and unmounting a repair mechanism or robotic assembly from the object or predetermined area.

8. A computer system for implementing additive manufacturing, the computer system comprising:

one or more computer processors;

one or more computer readable storage devices;

program instructions stored on the one or more computer readable storage devices for execution by at least one of the one or more computer processors, the stored program instructions comprising:

program instructions to receive, by a sensor set, data associated with an object or a predetermined area;

program instructions to retrieve, by a knowledge corpus, historic data associated with the object or the predetermined area;

program instructions to identify a defect on or within an object based on an identified difference in the received data and the historic data;

program instructions to identify, by the sensor set, a target area on the object to repair the defect;

program instructions to create, by a context-aware robotic system, a physical support around the target area, wherein the physical support comprises a mid-air boxed platform dynamically sized using a dynamic dice creation module; and program instructions to repair, by an additive manufacturing mechanism and the physical support, the defect by applying three-dimensional printing-based rectification to the defect.

9. The computer system of claim 8, wherein identifying the defect comprises:

program instructions to scan, by a sensor set, a predetermined area and the object to identify the target area.

10. The computer system of claim 8, wherein the robotic system is a robotic cloth.

11. The computer system of claim 8, further comprising:

program instructions to compare a cavity of the physical support with a shape and dimension of a three-dimensional printed object; and program instructions to identify a secondary material is required to complete the physical support based on the comparative result of the cavity and dimension of the three-dimensional printed object, wherein the secondary material is water soluble, and wherein the secondary material is dissolved or removed after the completion of the repair.

12. The computer system of claim 8, further comprising:

program instructions to align, by an IoT sensor, a repair mechanism with the target area and the physical support.

13. The computer system of claim 8, further comprising:

program instructions to scan, by a sensor set, a predetermined area or the target area to identify if the physical support is needed to execute the repair by corresponding collected data from the scan with previously utilized data stored in a knowledge corpus.

14. The computer system of claim 8, further comprising:

responsive to identifying that an additive manufactured area is solidified, program instructions to complete the repair by retracting or unmounting the physical support and unmounting a repair mechanism or robotic assembly from the object or predetermined area.

15. A computer program product for implementing additive manufacturing, the computer program product comprising:

one or more computer-readable storage media; and program instructions stored on the one or more computer-readable storage media to perform operations comprising:

receiving, by a sensor set, data associated with an object or a predetermined area;

retrieving, by a knowledge corpus, historic data associated with the object or the predetermined area;

identifying a defect on or within an object based on an identified difference in the received data and the historic data;

identifying, by the sensor set, a target area on the object to repair the defect;

creating, by a context-aware robotic system, a physical support around the target area, wherein the physical support comprises a mid-air boxed platform dynamically sized using a dynamic dice creation module; and repairing, by an additive manufacturing mechanism and the physical support, the defect by applying three-dimensional printing-based rectification to the defect.

16. The computer program product of claim 15, wherein identifying the defect comprises:

program instructions to scan, by a sensor set, a predetermined area and the object to identify the target area.

17. The computer program product of claim 15, further comprising:

program instructions to compare a cavity of the physical support with a shape and dimension of a three-dimensional printed object; and program instructions to identify a secondary material is required to complete the physical support based on the comparative result of the cavity and dimension of the three-dimensional printed object, wherein the secondary material is water soluble, and wherein the secondary material is dissolved or removed after the completion of the repair.

18. The computer program product of claim 15, further comprising:

program instructions to align, by an IoT sensor, a repair mechanism with the target area and the physical support.

19. The computer program product of claim 15, further comprising:

program instructions to scan, by a sensor set, a predetermined area or the target area to identify if the physical support is needed to execute the repair by corresponding collected data from the scan with previously utilized data stored in a knowledge corpus.

20. The computer program product of claim 15, further comprising:

responsive to identifying that an additive manufactured area is solidified, program instructions to complete the repair by retracting or unmounting the physical support and unmounting a repair mechanism or robotic assembly from the object or predetermined area.

*   *   *   *   *